United States Patent [19]
Weber et al.

[11] Patent Number: 5,191,734
[45] Date of Patent: Mar. 9, 1993

[54] BIODEGRADABLE LATEX WEB MATERIAL

[75] Inventors: Robert E. Weber, Marietta; Mary L. Delucia, Roswell, both of Ga.

[73] Assignee: Kimberly-Clark Corporation, Neenah, Wis.

[21] Appl. No.: 513,656

[22] Filed: Apr. 24, 1990

[51] Int. Cl.$^5$ ............................................. A01G 31/00
[52] U.S. Cl. ............................................. 47/9; 47/56
[58] Field of Search ................................... 47/9 S, 56

[56] References Cited

U.S. PATENT DOCUMENTS

| | | |
|---|---|---|
| 3,429,312 | 2/1969 | Stump . |
| 3,654,064 | 4/1972 | Laumann . |
| 3,683,917 | 8/1972 | Comerford . |
| 3,728,213 | 4/1973 | Hinz ............................. 47/9 S |
| 3,804,092 | 4/1974 | Tunc . |
| 3,805,446 | 4/1974 | Aoyagi ......................... 47/9 S |
| 3,923,592 | 12/1975 | George et al. . |
| 3,950,578 | 4/1976 | Laumann . |
| 3,951,893 | 4/1976 | Gander . |
| 3,952,347 | 4/1976 | Comerford et al. . |
| 3,954,104 | 5/1976 | Kraskin et al. . |
| 3,973,068 | 8/1976 | Weber . |
| 3,998,006 | 12/1976 | Riedel .......................... 47/9 S |
| 4,009,313 | 2/1977 | Crawford et al. . |
| 4,062,451 | 12/1977 | Gander . |
| 4,099,976 | 7/1978 | Kraskin et al. . |
| 4,186,233 | 1/1980 | Krajewski et al. . |
| 4,214,034 | 7/1980 | Kodera et al. ................ 47/9 S |
| 4,242,408 | 12/1980 | Evani et al. . |
| 4,278,727 | 7/1981 | Brabetz et al. . |
| 4,283,880 | 8/1981 | Fjeldsa ......................... 47/9 S |
| 4,381,772 | 5/1983 | Guistini et al. . |
| 4,390,650 | 6/1983 | Deiner et al. . |
| 4,412,833 | 11/1983 | Wiegner et al. . |
| 4,454,268 | 6/1984 | Otey et al. . |
| 4,522,967 | 6/1985 | Sheldon et al. . |
| 4,600,404 | 7/1986 | Sheldon et al. . |
| 4,632,860 | 12/1986 | D'Antonio et al. . |
| 4,762,738 | 8/1988 | Keyes et al. . |
| 4,818,585 | 4/1989 | Shipp, Jr. . |
| 4,818,600 | 4/1989 | Braun et al. . |
| 4,830,187 | 5/1989 | Keyes et al. . |
| 4,837,070 | 6/1989 | Weber et al. . |
| 4,855,132 | 8/1989 | Heller et al. . |

FOREIGN PATENT DOCUMENTS

| | | | |
|---|---|---|---|
| 0092625 | 7/1980 | Japan ............................ | 47/9 S |
| 0116736 | 9/1981 | Japan ............................ | 47/9 S |

OTHER PUBLICATIONS

ASTM Standard Test Method Designation D 882-88 for Tensile Properties of Thin Plastic Sheeting.

Marr, Charles W., William J. Lamont, Jr., "Plastic Mulches for Vegetables", Cooperative Extension Service, Kansas State University, Manhattan, Kansas.

Marr, Charles W., William J. Lamont, Jr., Danny Rogers, "Drip Irrigation for Vegetables", Cooperative Extension Service, Kansas State University, Manhattan, Kansas.

Klemchuk, Peter P., "Degradable Plastics: A Critcal Review", Polymer Degradation and Stability 27, (1990), pp. 183-202.

Cooper, R., "Barrier coatings for paper and board", Paper Technology, Apr. 1990, pp. 34-39.

Primary Examiner—David A. Scherbel
Assistant Examiner—Joanne C. Downs
Attorney, Agent, or Firm—Patrick C. Wilson

[57] ABSTRACT

Disclosed herein is a biodegradable latex web material which is suitable as a replacement for plastic in a wide variety of uses due to its good overall strength and its ratio of wet strength to dry strength. The material includes a web of cellulose fibers which, prior to treatment with a saturant, has a breaking length in the dry state ranging from about 0.80 to about 6.20 km. Optionally, the web can contain synthetic fibers to improve the tear strength of the material. In order to obtain tensile strengths which are comparable to plastics, the fibrous web is saturated with a latex composition which may be natural, synthetic or a combination of natural and synthetic polymers. In addition to latex, other additives may be incorporated into the saturant for special end use properties. The latexes used will have glass transition temperatures (Tg) of between about $-50°$ C. and about $20°$ C. If mixing natural and synthetic polymers together, the ratio of synthetic to natural polymers should be about 2:1 to about 4:1 by weight. The saturant compositions are applied to the base web at an add on from about 16 to about 80 dry parts saturant per 100 parts fiber by weight to form a latex web composite. The composite once formed should have an average strength of at least about 50 kg/cm$^2$ and a ratio of wet strength to dry strength ranging from about 0.2 to about 0.6.

5 Claims, No Drawings

BIODEGRADABLE LATEX WEB MATERIAL

BACKGROUND OF THE INVENTION

The present invention relates to a biodegradable and mulchable web material. More specifically the web material is a fibrous web of cellulose treated with a latex to yield a product with a ratio of wet strength to dry strength ranging from about 0.2 to about 0.6. The material is suitable for use in a wide variety of applications including, but not limited to, agricultural mulch and row covers, bags and outer covers for personal care absorbent products such as diapers, feminine pads, training pants, incontinence products and wound dressings. Other possible applications include surgical drapes and gowns as well as other disposable items.

Biodegradability has become one of the most important, discussed and researched topics as the beginning of a new century approaches. The topic of biodegradability is being researched for a wide variety of products and materials. Plastics, however, are the materials which are getting the most attention when it comes to biodegradability. Plastics are widely regarded as not being biodegradable because of the large amount of time it takes to break these materials down. Examples of such materials include: polyethylene, polypropylene, poly vinyl chloride, and most polyesters. A problem though in discussing the term biodegradability is the term itself. There are an abundance of definitions as to what is biodegradable and what biodegradability means from the standpoint of time and end degradation components.

One factor in determining biodegradability is the amount of oxygen and moisture available for the degradation process. Recent articles such as "Rubbish!" by William L. Rathje, The *Atlantic Monthly*, December 1989, ppg. 99-109, indicate that many landfills have insufficient oxygen and moisture to permit aerobic decomposition. One example given in the above article involved the excavation of a landfill which revealed newspapers from 1959 which were completely legible and in near perfect condition. Thus it can be seen that even materials such as newsprint, which is considered very biodegradable, will not degrade unless given the proper conditions.

One type of disposal which is fairly aerobic is mulching and composting. When certain materials are chopped and then mixed in with the top soil, an environment is created which is fairly conducive to degradation. Here again, however, some materials are more predisposed to degrading than others. For example, polyolefin films take lengths of time which are magnitudes greater than paper to break down. Today, many plastics are being mixed and extruded with other constituents, such as starch, to help them break down faster. But even in these cases the time to degrade is much longer than common paper. It is therefore an object of the present invention to provide a material which will degrade significantly when mulched and composted into the soil and yet will have the useful properties of many plastic films.

Thin plastic films are widely used today as replacements for paper. Perhaps one of the most common reasons plastics and especially plastic films are used instead of paper is the strength of plastics in both the wet and dry state. In addition, plastic films have gained their own niche due to the inherent properties of plastic. Examples of the widespread use of plastic include plastic bags, plastic wrap and outer covers for disposable products such as diapers, training pants, incontinence products and sanitary napkins. In all such cases the plastic is usually low cost, lightweight and high in strength in both the wet and dry states. As a result, at least from a convenience standpoint, products including these plastics are readily utilized by the consumer.

The agricultural field is another area where plastics are gaining wider use, particularly with respect to row covers and plastic mulches. Row covers or mulches are large strips of material which are laid down between rows of plants to control weeds, soil temperature and erosion. Under such conditions, the plastic has sufficient strength and integrity to withstand the rigors of usage including wind and rain. Despite these advantages, however, disposal becomes a problem. At some point in the agricultural cycle, the row covers must either be removed or mulched into the ground. Removal is very time consuming and mulching can result in the creation of a top soil layer which is laden with undecomposed or slowly decomposing plastic.

It is therefore an object of the present invention to provide a cellulose-based material which will have sufficient strength and barrier properties to act as a replacement for the above products while also having a sufficient degree of biodegradability.

These and other objects of the present invention will become more apparent upon a further review of the following specification and claims.

SUMMARY OF THE INVENTION

The present invention relates to a biodegradable latex-treated cellulose web which is suitable in many instances as a replacement for plastic in a wide variety of uses. The material of the present invention begins with a web of cellulose fibers. The fibers themselves are a composite blend of spruce, hemlock, jack pine and cedar wood pulps, the combination of which is called soft wood kraft pulp. Prior to being treated with a saturant, the web has a breaking length in the dry state ranging from about 0.80 to about 6.20 kilometers. Optionally, the web can contain synthetic fibers such as polyester and nylon to improve the tear strength of the material. In order to obtain tensile strengths which approach those of plastics, the fibrous web of the present invention is saturated with a latex composition which may be natural, synthetic or a combination of natural and synthetic polymers. In addition to latex, other soluble polymers and additives may be incorporated into the saturant for special end use properties. Examples of such additives include starch, protein, gum, fluorocarbons, clay, titanium dioxide, other inert fillers and cross-linking agents. Note that the addition of the cross-linking agent may either be an internal or an external addition. By using internal addition, selective components of the overall saturant can be cross-linked. Most typically the latexes used will have a glass transition temperature (Tg) of between about $-50°$ C. and about $20°$ C. When mixing synthetic and natural polymers together, the ratio of synthetic to natural polymers should be about 2:1 to about 4:1 by weight. The saturant compositions containing the latex when applied to the base web should have an add on from about 16 to about 80 dry parts saturant per 100 parts fiber by weight to form a latex web composite. Once the latex composition has been applied, dried and allowed to cure, the latex web composite should have an average strength of at least about 50 kg/cm² and a ratio of wet strength to dry strength ranging from about 0.2 to about 0.6.

For many applications, the material as described above is suitable as is. With some uses, however, personal care products and agricultural row covers being examples, it may be desirable to have higher barrier properties. In such cases, it has been found that additional coatings to the exterior surface of the saturated base web may be appropriate. Generally, the additional coatings may be the same as or combinations of the materials listed as being suitable for the base saturant.

The above materials according to the present invention when mulched and composted in aerobic soil rapidly decompose to a fraction of their original weight and strength in as little as two to three months. As a result, the material of the present invention can be engineered for a wide variety of uses including such things as outer covers for drapes, bags and agricultural row covers.

DESCRIPTION OF THE PREFERRED EMBODIMENTS

The present invention relates to a latex treated web of cellulosic fibers which is suitable for a wide variety of uses. For purposes of illustration only, the use of the present invention will be described in conjunction with personal care product applications and agricultural row cover/mulch applications. Such applications, however, should not be considered a limitation as to the use or application of the present invention. On the contrary, due to the aerobic biodegradability and mulchability of the present invention and its good ratio of wet strength to dry strength, the material of the present invention should be considered usable for a wide variety of applications.

The base material for the present invention is a web of cellulose fibers. The fibers themselves are a composite blend of spruce, hemlock, jack pine and cedar wood pulps the collection of which is commonly referred to as a soft wood kraft pulp. Individual fiber lengths generally range from about 2 to about 5 millimeters (mm) with fiber diameters ranging from about 20 to about 40 micrometers (um). Such webs are made using a Fourdrinier process and have basis weights from about 30 to about 230 grams per square meter (g/m²). For the present invention, breaking lengths for such materials in an untreated dry state range from about 0.80 to about 6.20 kilometers (km). In addition to the cellulose fibers, the web can contain synthetic fibers such as polyester and nylon and still be a very mulchable and biodegradable product. The addition of synthetic material can be in the form of a staple fiber or longer fibers such as a commonly found in the spunbonding and meltblowing processes. The addition of such fibers improves the tear strength of the material.

Untreated cellulosic webs while having relatively good dry strengths, have very poor wet strengths. As a result, plastics supplant many of the uses previously covered by paper. As shown below in Table I, plastics cover a wide variety of tensile strengths in both the wet and dry state depending upon the particular polymer chosen.

TABLE I

| TYPICAL PLASTIC FILM STRENGTHS | |
|---|---|
| | Tensile (kg/cm²) |
| Low Density Polyethylene | 125-190 |
| Medium Density Polyethylene | 140-250 |

TABLE I-continued

| TYPICAL PLASTIC FILM STRENGTHS | |
|---|---|
| | Tensile (kg/cm²) |
| High Density Polyethylene | 210-700 |
| Unoriented Polypropylene | 210-420 |
| Biaxially Oriented Polypropylene | 900-2100 |
| PVC Flexible Extruded | 280-700 |
| Polyethylene Film (Outer Diaper Cover) | 82 |

In order to obtain tensile strengths which approach those of the above plastics, the fibrous webs of the present invention are saturated with a latex composition which may be natural, synthetic or a combination of natural and synthetic polymers. In addition to latex, other soluble polymers and additives may be incorporated into the saturant for special end use properties. For purposes of the present invention, latex is defined as an emulsion of rubber or plastic globules in water, used in the manufacture of paints, adhesives and various synthetic rubber products. Most typically the latex is an aqueous emulsion, however, solvent based compositions also can be used. Natural polymers are high molecular weight materials derived from plants and animals, i.e., starches, proteins, etc. Synthetic polymers are high molecular weight materials that are man made and have repeating molecular units. Solution polymers are high molecular weight materials that are dissolved in or dispersed in a solvent and are not in a globular form such as a latex. For purposes of the present invention, the term latex is meant to include all latexes, whether natural, synthetic or a combination, as well as solution polymers, synthetic and natural polymers and combinations of the foregoing. Examples of these solution polymers are starches, proteins and gums. Other additives that may be incorporated are fluorocarbons, clay, titanium dioxide, other inert fillers and cross-linking agents. When using cross-linking agents, the agents can be added either internally or externally to the material being cross-linked. By using internal addition, selective components of the overall saturant can be cross-linked. Examples of suitable latex compositions are set forth below in Table II.

TABLE II

| SYNTHETIC LATEXES | |
|---|---|
| Polyacrylates | Hycar ® 26083, 26084, 26120, 26106 and 26322 |
| | B. F. Goodrich Company Cleveland, OH |
| | Rhoplex ® B-15, HA-8, HA-12, NW-1715 |
| | Rohm and Haas Company Philadelphia, PA |
| Styrene butadiene polymers | Polysar ® 958 |
| | Polysar Limited Sarnia, Ontario |
| | DL-219, DL-283 |
| | Dow Chemical Company Midland, MI |
| Polyethylene vinylacetate | Dur-O-Set ® E-666, E-646, E-669 |
| | National Starch & Chemical Co. Bridgewater, NJ |
| Nitrile rubber | Hycar 1572, 1570 × 55 |
| | B. F. Goodrich Company Cleveland, OH |
| Poly vinyl chloride | Geon ® 576 |
| | B. F. Goodrich Company Cleveland, OH |
| SOLUTION SYNTHETIC POLYMER | |
| Polyacrylate | Carboset ® XL-52 |
| | B. F. Goodrich Company Cleveland, OH |

TABLE II-continued

| | |
|---|---|
| Polyethylene acrylate | Primacon ® 4990 |
| | Dow Chemical Company |
| | Midland, MI |
| SOLUTION NATURAL POLYMER | |
| Starch | Penford Gums 290, 380 |
| | Penford Products Company |
| | Cedar Rapids, IA |
| | Ethylex ® Gums 2015, 2020, 3030 |
| | A.E. Staley Company |
| | Decatur, IL |
| Soy Protein | Pro-Cote ® 240, 400 |
| | Protein Technologies Inter. |
| | St. Louis, MO |
| NATURAL LATEX POLYMER | |
| Natural Rubber | Hartex ® 104 |
| (cis 1,4 polyisoprene) | Firestone Synthetic Rubber |
| | and Latex Co. |
| | Akron, OH |

Based upon the testing set forth below, carboxylated latexes appear to work the best. Most typically the latexes used will have a glass transition temperature (Tg) of between about −50° C. and about 20° C. When mixing synthetic and natural polymers together, the ratio of synthetic to natural polymers should be about 2:1 to about 4:1 by weight. The use of natural polymers accelerates the biodegrading process.

The saturant compositions containing the latex when applied to the base web should have an add on from about 16 to about 80 dry parts saturant per 100 parts fiber by weight to form a latex web composite. Once the latex composition has been applied, dried and allowed to cure, the latex web composite should have an average strength of at least about 50 kg/cm$^2$ and a ratio of wet strength to dry strength ranging from about 0.2 to about 0.6. The saturated web of cellulose fibers is impregnated by directing the web through a bath of saturant containing the latex. The web is then squeezed between rolling press rolls to remove excess saturant. Next, the web is dried at a temperature of 107° C. on heated rotating drums. Following this, the web is generally wound while hot into a roll to cure and develop the necessary wet strength properties of the web. In some cases this cure for wet strength can take place at room temperature when specific polymers and curing aids are used.

For many applications the material as presently described is suitable for a wide variety of uses. With some uses, personal care products and agricultural row covers being examples, it may be desirable to have higher barrier properties. In such cases, it has been found that additional coatings to the exterior surface of the saturated base web may be appropriate. Where the cellulose-latex web is coated with additional polymers, generally an aqueous coating is preferred. In this case a Mayer rod or an air knife can be used to apply these coatings. These coatings are dried using known standard methods to dry coated webs. Other coating techniques that can be used are reverse roll, rotogravure or a fixed metering nip method. In some cases hot melt or extrusion coating methods may be useful. Suitable coatings are additional layers of the same materials used as the saturant and well as other coating compositions.

To evaluate the properties and advantages of the present invention, several test methods and procedures were used. Several of these test methods are set forth below. Other test methods within the present application are referenced to standard procedures which are incorporated herein by reference.

TEST METHODS

Tensile properties of thin plastic sheeting—Test Method ASTM D882-88,

| | |
|---|---|
| Sample preparation: | sample width 15 mm, cut on a precision TMI cutter |
| | sample length not less than 150 mm |
| | sample thickness measured in a TMI model 49-70, Precision Micrometers to nearest 0.001 mm |
| Tensile tester: | Instron Model 1122 |
| | Instron grip separation, 100 mm |
| | Initial strain rate $\frac{3 \text{ mm}}{\text{mm min.}}$ |

Tensile strength is based on the maximum tensile of the material and is an average of machine direction (MD) and cross direction (CD) values of the web divided by the original minimum cross-sectional area of the specimen.

Tensile strength for wet tensiles are calculated based upon the unit area measurements before wetting. In this case, the prepared test strips are soaked in a 1% aqueous Triton ® X-100 solution for one hour before testing. Triton ® X-100 is manufactured by Rohm and Haas Company of Philadelphia, PA.

The tensile strength of the unsaturated webs of the present invention is measured by the breaking length of the web which is the average of the MD and CD tensile strengths in kilograms per meter (kg/m) divided by the basis weight of the web in kilograms per meter square (kg/m$^2$) to produce a web whose breaking length is expressed as a unit length using TAPPI method T 494-OM-81. Breaking length, simply stated, is the length of a web that when suspended from one end will break under its own weight.

EXAMPLES

EXAMPLE I

A cellulose web of softwood kraft fiber with a basis weight of 39 g/m$^2$ and a breaking length of 4.34 km was saturated with an aqueous latex emulsion of Dur-O-Set ® E-669 from Nation Starch and Chemical Co. which is a self-cross-linking ethylene vinylacetate polymer with a Tg of −20° C. The latex web composite was dried on a steel drum at 107° C. to remove all water and then cured in an oven at 107° C. for 3 hours to cross-link the latex polymer. The dried and cured latex web composite had a dry add on of 24 parts latex polymer for every 100 parts cellulose fiber. The combined average strength of the material in the machine (MD) and cross-directions (CD) per the outlined test method was 370 kg/cm$^2$. Measurements for the ratio of wet strength to dry strength yielded a value of 0.36.

Samples of the above material having dimensions of 50 mm ×250 mm were tested for biodegradability by burying them in soil for specified periods of time and then removing selected samples to determine the amount of biodegradation by measuring both strength and weight loss. Samples were sealed in individual packets of 14 g/m$^2$ spunbond polypropylene web to protect the samples from physical damage while being exposed to the microbe environment of the soil. The polypropylene web was essentially inert to the bio-environment but sufficiently open to allow microbes to pass through the web to be in contact with the test samples.

In this way, the samples were kept relatively clean and free from outside damage. At a specified time one of the packets was removed from the soil and opened to remove the test sample. The sample was then tested for weight and strength losses.

The soil used for the aerobic biodegradability testing contained typical microorganisms and was housed in a redwood 91 cm×91 cm×61 cm (1×w×h) container with drainage ports in its bottom. The drainage ports were approximately 1.8 cm in diameter had had a radial separation of approximately 10 cm. Soil depth was 43 cm. The container was spaced approximately 5 cm off the ground and was openable at the top but was kept covered with a 2 cm outdoor plywood lid. A soil assay showed bacillus and pseudomonas species, gram positive and gram negative rods, mold, and oxidative-fermentative bacteria. No predominant microorganism was found. The biodegradation experiments were run in an outdoor environment. The soil temperature was measured, but not controlled and ranged from a low of 5° C. to a high of 18° C. The pH of the soil was 5.6, and the moisture content was approximately 40% by weight.

The weight loss and resultant loss in machine direction tensile strength for the samples at 30, 52 and 90 days from initial burial are shown in Table III. At day 30, the sample had lost 82% of its strength yet there was no appreciable change in the sample's weight. At day 52 the sample had no measurable strength and had lost 39% of its weight due to the microbes feeding on the sample. At this stage the sample has been consumed to the point where it could be completely mulched into the surrounding environment. By day 90, the sample had lost 82% of its weight.

TABLE III

BIODEGRADABLE CELLULOSE-ETHYLENE VINYLACETATE COMPOSITE

| Time (Days) | Basis Weight (g/m$^2$) | % (Weight Loss) | Tensile (MD) (kg/cm$^2$) | (Orig. Residual) Original % Strength Loss |
|---|---|---|---|---|
| Start | 51 | NA | 547 | NA |
| 30 | 51 | None | 100 | 82 |
| 52 | 31 | 39 | Zero | 100 |
| 90 | 9 | 82 | Zero | 100 |

EXAMPLE II

A cellulose web of soft wood kraft fiber with a basis weight of 50 g/m$^2$ and a breaking length of 3.19 km was saturated with a latex emulsion of a self cross-linking polyethylacrylate polymer with a Tg of −15° C. (Hycar ® 26322 from B. F. Goodrich Co.) The composite was dried to remove all water and then cured at 107° C. for three hours to cross-link the latex polymer. The final composite consisted of 50 parts latex polymer for every 100 parts cellulose fiber. The material had an average strength of 254 kg/cm$^2$ with a wet to dry strength ratio of 0.52. Samples, 50 mm×250 mm, were again buried in the same fashion as Example I and the resultant test data is presented in Table IV.

TABLE IV

BIODEGRADABLE CELLULOSE-POLYETHYLACRYLATE COMPOSITE

| Time (Days) | Basis Weight (g/m$^2$) | % (Weight Loss) | Tensile (MD) kg/cm$^2$ | % (Tensile Loss) |
|---|---|---|---|---|
| Start | 75 | NA | 273 | NA |
| 30 | No Test | — | 41 | 85 |
| 35 | 46 | 39 | Zero | 100 |
| 54 | 26 | 65 | Zero | 100 |

As can be seen from Table IV, at day 35, the sample had a 39% reduction in its weight and the tensile strength had already gone to zero. By day 54, a sample of the same material had lost 65% of its original weight, thereby demonstrating the significant speed with which such a material can be broken down within an aerobic environment.

EXAMPLE III—Diaper Outer Cover Liner I

A cellulose fiber-latex composite as described in Example II was dry microcreped to develop a cloth-like hand. The microcreped material has a Handle-O-Meter value of 34 grams (g). (Handle-O-Meter test method: Tappi T498SU66.) The value before microcreping was 94 g. Note that the lower the value the more drapable the material. See, for example, U.S. Pat. No. 3,973,068 for the use of such a test.

Nineteen grams of an additional coating was applied to the microcreped web to provide a liquid barrier to urine. The Mayer rod method of coating was used. The coating was an aqueous formulation consisting of:

| | % Dry Weight |
|---|---|
| Carboxylated acrylic latex (Tg of −9° C.)* | 77.2 |
| Pentaerythritol-Tris-[B-(N-Aziridinyl) propionate (cross-linking agent) | 1.6 |
| Fluorochemical emulsion* | 1.9 |
| Titanium dioxide pigment** | 19.3 |
| | 100.0 |

*Rhoplex ® NW 1715 by Rohm and Haas of Philadelphia, PA
**FC-461 by Ciba-Geigy, Greensboro, NC
***TiO$_2$ by DuPont, Wilmington, DE The Handle-O-Meter value of the finished product was 57 g. The biodegradable characteristic of the base paper of this type of outer cover liner would be illustrated by the data Table IV. However, as the web decomposes, the attached additional coating would most likely become mulchable and chemically decompose at a slower rate.

EXAMPLE IV—Diaper Outer Cover Liner II

The base web for this example was the same as Example III but with an additional coating of a rapidly biodegradable liquid barrier to urine. The coating was an aqueous formulation consisting of:

| | % Dry Weight |
|---|---|
| Natural rubber latex | 60 |
| Soy protein | 20 |
| Fluorochemical emulsion | 2 |
| Titanium dioxide pigment | 9 |
| Kaolin Clay* pigment | 9 |
| | 100 |

*Ultra White 90 ® by Engelhard Corp., Edison, NJ

In this case, the 20 g/m² coating was applied to the dry creped web using the Mayer rod method. The coating would again biodegrade at a rate similar to that of the base web in Table IV due to the natural components contained therein.

EXAMPLE V—Diaper Outer Cover Liner III

A cellulose web similar to Example I, but with a basis weight of 50 g/m² and a breaking length of 3.19 km was saturated with a latex emulsion of a carboxylated styrene butadiene containing 42% bound styrene and a natural rubber latex in a dry weight ratio of 2:1 respectively. The carboxylated styrene butadiene component was Polysar 958 by Polysar Limited and the natural rubber latex was Hartex® 104 from the Firestone Synthetic Rubber and Latex Co. of Akron, Ohio. The saturated web was dried and cured as in Example I and had a dry add on of 70 parts saturant for every 100 parts cellulose fiber. The average strength of the web was 304 kg/cm² and the wet to dry strength ratio was 0.42. As with the other samples, the dry composite web was microcreped to develop a cloth-like hand.

EXAMPLE VII—Agri-ground Cover Mulch

In this example the cellulose web of softwood kraft fiber was combined with 3 denier, 6 mm polyester fibers in a ratio of 85:15 respectively. The basis weight of the sample was 50 g/m². The purpose of the polyester is to provide a higher tear resistant agri-ground cover. The polyester has no effect on the tensile strength characteristic. Therefore, the physical properties of this material remain approximately the same as that of Example VI when the 15% polyester fiber is substituted. In this case the average internal (MD) and (CD) tear resistance increases from 54 g to approximately 108 g. (Internal Tear Test: Tappi T414 TS-65). It should be noted that the polyester fiber does not biodegrade, but because the major fraction of the composite is very biodegradable, the polyester easily disperses as mulch.

EXAMPLE VIII

Other examples of mulchable ground covers that are useful as well as very biodegradable when buried beneath the soil are summarized in Table V.

TABLE V

| BASE CELLULOSE WEB | | SATURANT FORMULATION | | SATURANT ADD ON | AVERAGE | WET/DRY |
|---|---|---|---|---|---|---|
| WEIGHT (g/m²) | BREAKING LENGTH (km) | COMPOSITION | DRY WEIGHT RATIO | PARTS/100 PARTS FIBER | STRENGTH (kg/cm²) | STRENGTH RATIO |
| 50 | 3.19 | SBR:NR | 2:1 | 80 | 304 | 0.42 |
| 50 | 3.19 | SBR:STARCH | 4:1 | 38 | 317 | 0.21 |
| 54 | 3.19 | SBR:PROTEIN | 2:1 | 37 | 284 | 0.28 |
| 54 | 3.19 | PVC:NR | 1:1 | 40 | 189 | 0.22 |
| 50 | 3.19 | SBR:NR | 4:1 | 16 | 230 | 0.30 |

SBR: Carboxylated styrene-butadiene latex with 42% bound styrene
NR: Natural rubber latex
STARCH: Penford gum 380
PROTEIN: Soy protein, Pro-Cote® 240
PVC: Geon® 576

A twenty gram coating of the same coating composition used in Example IV was applied to the microcreped web to provide a liquid barrier to urine. The Mayer rod method of coating was used. The large amounts of natural polymer, natural rubber and soy protein were added to provide rapid bio-decomposition in a moist aerobic environment.

EXAMPLE VI—Agri-ground Cover Mulch

A cellulose web of a softwood kraft fiber with a basis weight of 47 g/m² and a breaking length of 5.09 km was saturated with a carboxylated styrene-butadiene latex with 42% bound styrene by weight and 6% carbon black. The latex used was the same as that used in Example V. The composite was dried and cured for 3 hours at 107° C. The dry saturant add on was measured to be 25 parts by weight per 100 parts fiber. The average strength of the web was 349 kg/cm² with a wet to dry strength ratio of 0.29.

The biodegradable properties would again be similar to those in Table III. There should be little difference in the break down of the cellulose web of ethylene vinyl acetate or styrene butadiene cellulose composites at a polymer add on of 24 to 25 parts per 100 parts fiber by weight, but because the composite was used as a surface cover between rows of cultivated crops, the useful life is estimated to be about 90 days. In some cases a more cloth-like cover may be desired such as for greenhouse applications. In this case the composite can be dry microcreped. In addition, the cover may be apertured to permit rain and liquid chemicals to soak into the ground.

All of the above are white to light tan in color, but can be pigmented with carbon black to develop a gray to black cover for greater solar heat absorption. In addition all of the above formulations can be used as additional coatings on the fiber-latex composite for greater soil moisture retention.

In addition to the useful ground web composites, all examples of agri-fabric are useful as biodegradable bag stock material in the manufacture of bags for lawn clippings, weeds, etc. when the total bag with clipping is used in a mulching/composting operation.

Having thus described the invention in detail, it should be apparent that various modifications and changes can be made without departing from the spirit and scope of the following claims.

We claim:

1. An agricultural row cover comprising:
   a fibrous web including a plurality of cellulose fibers, said web having a breaking length of at least 0.80 kilometers and no greater than about 6.20 kilometers,
   said web being treated with a saturant containing a latex in an add on from about 16 to about 80 dry parts saturant per 100 parts fiber by weight to form a latex web composite, said web composite having an average strength of at least about 50 kg/cm² and a ratio of web strength to dry strength ranging from about 0.2 to about 0.6.

2. The agricultural row cover of claim 1 wherein said latex web composite contains a plurality of apertures extending therethrough.

3. The agricultural row cover of claim 1 wherein said fibrous web further includes a plurality of reinforcing fibers to reduce tearing of said row cover, said reinforcing fibers having a length of at least 6 mm.

4. The agricultural row cover of claim 1 wherein said row cover includes an additional layer of latex on an outer surface of said cover.

5. The agricultural row cover of claim 4 wherein said additional layer of latex includes a synthetic polymer and a natural polymer in a ratio by weight of about 2:1 to about 4:1 respectively.

* * * * *

UNITED STATES PATENT AND TRADEMARK OFFICE
CERTIFICATE OF CORRECTION

PATENT NO. : 5,191,734
DATED : March 9, 1993
INVENTOR(S) : Robert E. Weber, Mary L. Delucia It is certified that error appears in the above-identified patent and that said Letters Patent is hereby corrected as shown below:

Column 7, line 10, "diameter had had a " should read --diameter and had a--.

Signed and Sealed this

Twenty-eighth Day of November 1995

Attest:

BRUCE LEHMAN

Attesting Officer        Commissioner of Patents and Trademarks